United States Patent
Kumar (10) Patent No.: US 7,066,091 B2
(45) Date of Patent: Jun. 27, 2006

(54) METHODS AND APPARATUS FOR CONTROLLING IMPURITY LEVELS IN AN ENCLOSED PRINTING PRESS ENVIRONMENT

(75) Inventor: Selva X. Kumar, Lombard, IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 10/463,562

(22) Filed: Jun. 16, 2003

(65) Prior Publication Data

US 2004/0250722 A1    Dec. 16, 2004

(51) Int. Cl.
B41F 1/54 (2006.01)
B41L 5/12 (2006.01)
B05B 15/12 (2006.01)

(52) U.S. Cl. .......................... 101/484; 454/50; 454/51; 454/52; 454/53; 454/54; 454/59; 454/67

(58) Field of Classification Search ............... 101/484; 454/49, 50, 51, 52, 53, 54, 67, 238, 239, 454/69, 59
See application file for complete search history.

(56) References Cited

U.S. PATENT DOCUMENTS

| | | | | |
|---|---|---|---|---|
| 3,545,675 | A * | 12/1970 | Taylor | 236/38 |
| 3,905,126 | A * | 9/1975 | Villalobos et al. | 34/72 |
| 4,392,417 | A | 7/1983 | Johannsen | |
| 4,407,185 | A | 10/1983 | Haines et al. | |
| 4,437,608 | A * | 3/1984 | Smith | 236/13 |
| 4,478,048 | A * | 10/1984 | Dills | 62/126 |
| 4,773,311 | A | 9/1988 | Sharp | |
| 4,841,733 | A * | 6/1989 | Dussault et al. | 62/93 |
| 4,902,315 | A | 2/1990 | Spicer | |
| 4,938,404 | A * | 7/1990 | Helms et al. | 226/10 |
| 4,963,168 | A * | 10/1990 | Spencer | 96/122 |
| 4,995,307 | A * | 2/1991 | Floyd | 454/299 |
| 5,060,396 | A * | 10/1991 | Hansen | 34/452 |
| 5,115,967 | A * | 5/1992 | Wedekind | 236/46 R |
| 5,134,788 | A * | 8/1992 | Stibbe et al. | 34/524 |
| 5,197,666 | A * | 3/1993 | Wedekind | 236/46 R |
| 5,257,736 | A * | 11/1993 | Roy | 236/49.3 |
| 5,312,297 | A | 5/1994 | Dieckert et al. | |
| 5,356,334 | A | 10/1994 | Gray | |
| 5,643,077 | A | 7/1997 | Ayer | |
| 5,720,658 | A | 2/1998 | Belusa | |
| 5,819,721 | A | 10/1998 | Carr et al. | |
| 5,928,077 | A * | 7/1999 | Kisakibaru | 454/187 |
| 6,143,080 | A | 11/2000 | Bartholomew et al. | |
| 6,312,328 | B1 * | 11/2001 | Nakajima et al. | 454/187 |
| 6,481,635 | B1 | 11/2002 | Riley et al. | |
| 6,514,138 | B1 | 2/2003 | Estepp | |
| 2002/0092198 | A1 * | 7/2002 | Bria et al. | 34/444 |
| 2002/0178954 | A1 * | 12/2002 | Hayashi et al. | 101/487 |

* cited by examiner

*Primary Examiner*—Andrew H. Hirshfeld
*Assistant Examiner*—Marvin P. Crenshaw
(74) *Attorney, Agent, or Firm*—Hanley, Flight & Zimmerman (57) ABSTRACT

Methods and apparatus for controlling impurity levels in an enclosed printing press environment are disclosed. A disclosed system controls impurity levels by using variable speed fans to control the intake of air into the enclosed environment and the exhausting of air from the enclosed environment. The exhaust fan is used to control the impurity levels within the enclosed environment. Adjustments to the speed of the exhaust fan are based on sensors which measure impurity levels in the enclosed environment. The intake fan is used to maintain a constant static pressure level within the enclosed environment. Adjustments to the intake fan speed are based on static pressure sensors within the enclosed environment.

47 Claims, 5 Drawing Sheets

METHODS AND APPARATUS FOR CONTROLLING IMPURITY LEVELS IN AN ENCLOSED PRINTING PRESS ENVIRONMENT

TECHNICAL FIELD

The present disclosure pertains to enclosed environments for printing presses and, more particularly, to methods and an apparatus for controlling impurity levels in an enclosed environment for a printing press.

BACKGROUND

Printing press environments are potentially hazardous environments. The operation of a printing press may generate hazardous contaminants and other byproducts which are released into the air surrounding the printing press. These contaminants and other byproducts need to be controlled to ensure a safe working environment and to meet federal regulations which mandate the amount of impurities that may be in the air. Toluene is an example of an impurity which may be found in an enclosed environment for a printing press. Toluene is an explosive chemical. Concentration levels of toluene in the air surrounding the printing press need to be closely monitored and controlled.

Present methods to control impurity levels within the printing press environment use a constant exhaust fan speed. The speed of the exhaust fan is chosen to prevent impurity levels from reaching worst case conditions (e.g., an upper threshold of impurity levels). However, the impurity levels in the printing press environment fluctuate due to different stages of the printing process and from different materials that are being printed. Since the impurity levels fluctuate, there are periods of time when the impurity levels are far below the upper threshold and therefore do not require the exhaust fan speed to be equal to the speed required to prevent the worst case condition. The lack of exhaust fan speed control results in a first source of wasted energy.

Typically, a constant static pressure is also maintained in the enclosed environment for a printing press to assist with the containment of the impurities produced by the printing press. The constant static pressure is maintained by an intake fan with a constant speed. The total volume of air supplied to the environment by the intake fan is equal to the total volume of air exhausted by the exhaust fan. Again, due to the fluctuations in the impurity levels within the printing press environment and the constant exhaust fan speed, the intake fan is not being used efficiently. This results in a second source of wasted energy.

In addition to a constant static pressure, a constant temperature is typically maintained in the enclosed environment for a printing press. To maintain a constant temperature within the enclosed environment for a printing press, the air supplied by the intake fan needs to be conditioned (e.g., heated or cooled). Because the speed of the intake fan is constant, a larger volume of air is being supplied to the enclosed environment than would be necessary if the exhaust fan speed (and therefore the intake fan speed) were not constant. This leads to a greater volume of air that needs to be conditioned by the heating and cooling units. This results in a third source of wasted energy.

DETAILED DESCRIPTION

Generally, the disclosed system controls an enclosed printing press environment by adjusting the speeds of fans to control the intake and exhausting of air from the enclosed environment. The speed of an exhaust fan is adjusted to control impurity levels associated with printing presses. However, varying the speed of the exhaust fan causes variations in the pressure level of the enclosed environment. Accordingly, the speed of an intake fan is adjusted to control the pressure level of the enclosed environment. In order to facilitate these adjustments, the enclosed environment contains various sensors, to monitor different conditions within the environment, and controllers, to adjust the fan speeds based on the sensor measurements.

Figure 1:
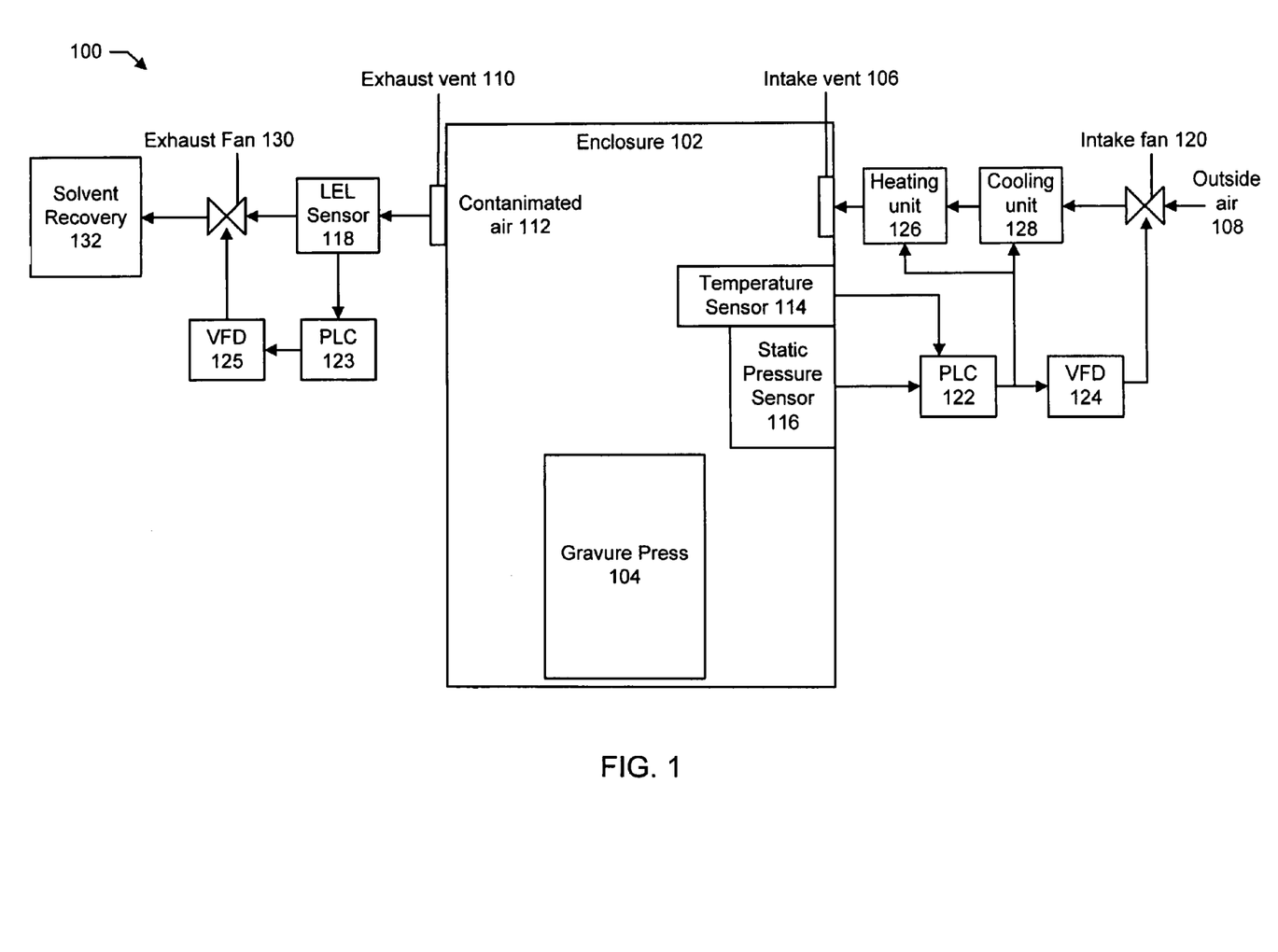
FIG. 1 is a block diagram of an example printing press environment.

FIG. 1 is a block diagram of an example printing press environment illustrating an environment of use for the disclosed system. The enclosed environment may be a printing press environment 100 or any other enclosed environment. In the example illustrated, the printing press environment 100 includes an enclosure 102 surrounding a gravure press 104. The enclosure 102 may be a structure that prevents byproducts generated from the gravure press 104 from flowing into areas inhabited by people. The enclosure 102 may contain an intake vent 106 to provide the enclosure 102 with a supply of outside air 108. The enclosure 102 may contain an exhaust vent 110 to provide the enclosure 102 with a means to remove the contaminated air supply 112, caused by the gravure press 104, from the enclosure 102. Although a gravure press 104 is illustrated, any type of printing press may be used.

The printing press environment 100 may contain different sensors for monitoring conditions inside the enclosure 102. Example sensors may include a temperature sensor 114, a static pressure sensor 116, and a lower explosive limit level (LEL) sensor 118. Of course, a person of ordinary skill in the art will readily appreciate that sensors other than those illustrated in FIG. 1 may be used to monitor different conditions within the printing press environment 100. For example, sensors may be added to monitor the humidity in the supply of outside air 108 or sensors to monitor radiation levels within the enclosure 102 may be added.

The supply of outside air 108 may be provided via the intake vent 106 and an intake fan system 120. The intake fan system 120 may be controlled by a programmable logic controller (PLC) 122 and a variable frequency drive (VFD) 124. The PLC may be, but is not limited to, any type of microcontroller based system, FPGA based system, or computer system. The PLC 122 may receive sensor measurements (e.g. static pressure measurements and/or temperature measurements) and adjust the VFD 124 to control the speed of the intake fan 120.

The supply of outside air 108 may be conditioned before it reaches the enclosure 102. A heating unit 126 and/or a cooling unit 128 may be added to condition the outside air 108 and control the temperature of the air going into the enclosure 102. The PLC 122 may adjust the heating unit 126 and/or the cooling unit 128 to maintain a desired temperature range in the enclosure 102. The supply of outside air 108 may also be conditioned in other ways, such as the addition/removal of humidity.

The contaminated air 112 may be removed from the enclosure 102 via the exhaust vent 110 and an exhaust fan system 130. The exhaust fan system 130 may be controlled by the PLC 122 or by a second PLC 123 and a second VFD 125. FIG. 1 illustrates an example system using two different PLC's to control the intake and exhaust fans, but a single PLC may be used to control the fans if the single PLC can satisfy all the requirements that may be imposed on it, such as computational requirements, input/output requirements, and/or size requirements. The PLC 123 may receive sensor measurements (e.g. LEL level measurements indicative of toluene levels) and adjust the VED 125 to control the speed of the exhaust fan 130. The contaminated air 112 may be exhausted to a solvent recovery system 132. The solvent recovery system 132 may remove the contaminants for recycling and/or disposal, or the solvent recovery system 132 may process the contaminated air 112 in some other way.

Figure 2:
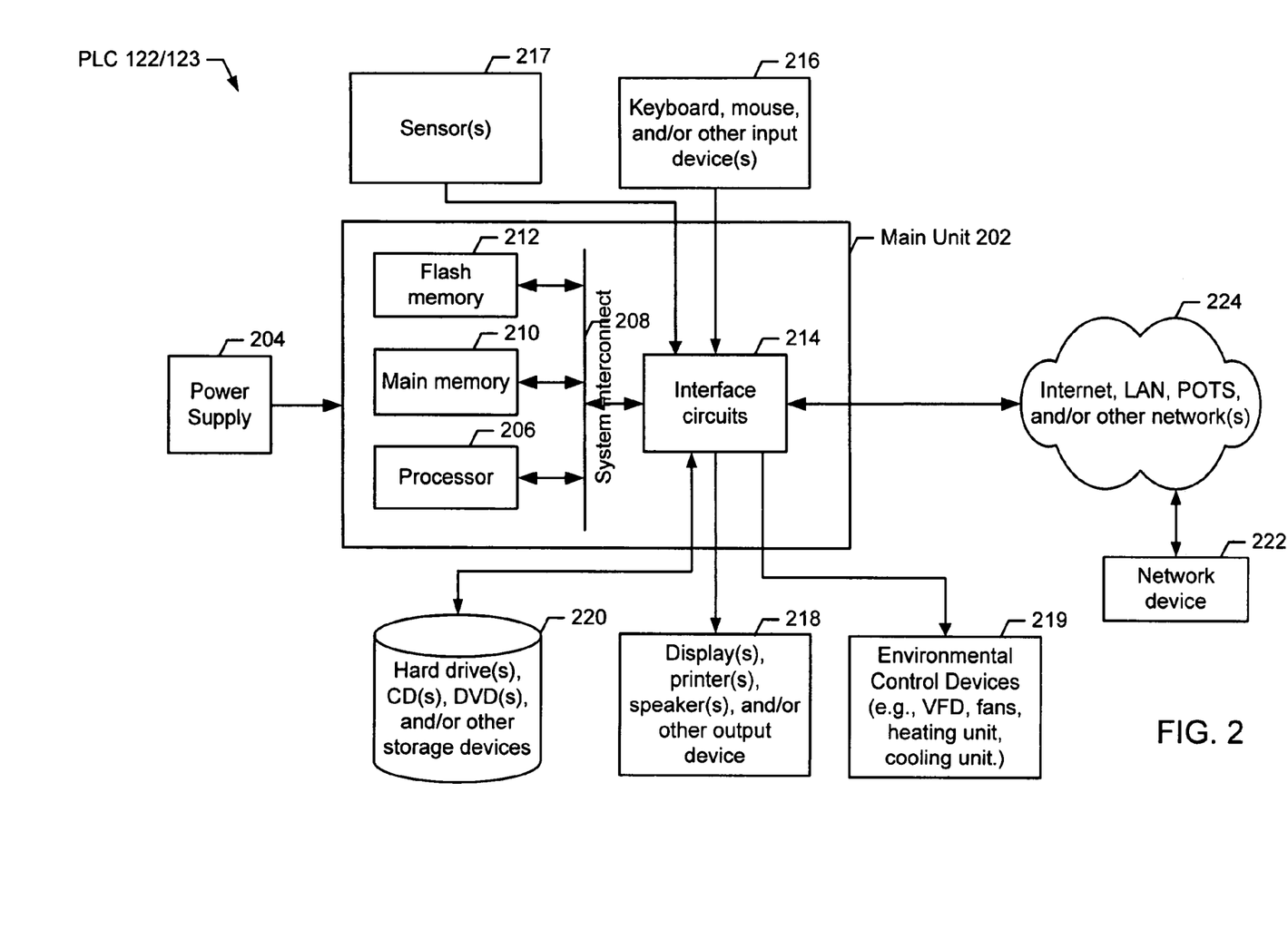
FIG. 2 is a block diagram of an example programmable logic controller which may be used by the system shown in FIG. 1.

FIG. 2 is a block diagram of an example PLC 122 or 123 used in the disclosed system. The PLC 122/123 may be a personal computer (PC) or any other computing device. In the example illustrated, the PLC 122/123 includes a main processing unit 202 powered by a power supply 204. The main processing unit 202 may include a processor 206 electrically coupled by a system interconnect 208 to a main memory device 210, a flash memory device 212, and one or more interface circuits 214. In an example, the system interconnect 208 is an address/data bus. Of course, a person of ordinary skill in the art will readily appreciate that interconnects other than busses may be used to connect the processor 206 to the other devices 210–214. For example, one or more dedicated lines and/or a crossbar may be used to connect the processor 206 to the other devices 210–214.

The processor 206 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 206 may include any type of well known cache memory, such as static random access memory (SRAM). The main memory device 210 may include dynamic random access memory (DRAM) and/or any other form of random access memory. For example, the main memory device 210 may include double data rate random access memory (DDRAM). The main memory device 210 may also include non-volatile memory. In an example, the main memory device 210 stores a software program which is executed by the processor 206 in a well known manner. The flash memory device 212 may be any type of flash memory device. The flash memory device 212 may store firmware used to boot the PLC 122/123.

The interface circuit(s) 214 may be implemented using any type of well known interface standard, such as an Ethernet interface and/or a Universal Serial Bus (USB) interface. One or more input devices 216 may be connected to the interface circuits 214 for entering data and commands into the main processing unit 202. For example, an input device 216 may be a keyboard, mouse, touch screen, track pad, track ball, isopoint, and/or a voice recognition system.

In addition to these standard input devices, one or more sensors 217 may be connected to the interface circuits 214. The sensors 217 may be the temperature sensor 114, the LEL sensor 118, the static pressure sensor 116, and/or some other type of sensor to measure other environmental parameters. FIG. 1 illustrates an example temperature sensor 114 connected to the PLC 122. The temperature sensor 114 may be connected through the USB interface or some other well-known interface circuit.

One or more displays, printers, speakers, and/or other output devices 218 may also be connected to the main processing unit 202 via one or more of the interface circuits 214. The display 218 may be a cathode ray tube (CRT), a liquid crystal display (LCD), or any other type of display. The display 218 may generate visual indications of data generated during operation of the main processing unit 202. The visual indications may include prompts for human operator input, calculated values, detected data, etc.

In addition, one or more environmental control devices 219 may be connected to the main processing unit 202 via one or more of the interface circuits 214. The environmental control device 219 may be the intake fan 120, the VFD 124, a device to add humidity to the environment, and/or some other type of environmental control device. As illustrated in FIG. 1, the heating unit 126, the cooling unit 128, and the VFD 124 are all connected to the PLC 122.

The PLC 122/123 may also include one or more storage devices 220. For example, the PLC 122/123 may include one or more hard drives, a compact disk (CD) drive, a digital versatile disk drive (DVD), and/or other computer media input/output (I/O) devices.

The PLC 122/123 may also exchange data with other devices 222 via a connection to a network 224. The network connection may be any type of network connection, such as an Ethernet connection, digital subscriber line (DSL), telephone line, coaxial cable, etc. The network 224 may be any type of network, such as the Internet, a telephone network, a cable network, and/or a wireless network. The network devices 222 may be any type of network devices 222. For example, the network device 222 may be a client, a server, a hard drive, etc.

FIGS. 3–6 are flowcharts representative of example machine readable instructions which may be executed by a device to implement an example method of controlling an enclosed environment. Preferably, the illustrated processes 300–600 are embodied in one or more software programs which are stored in one or more memories (e.g., flash memory 212 and/or hard disk 220) and executed by one or more processors (e.g., processor 206) in a well-known manner. However, some or all of the blocks of the processes 300–600 may be performed manually and/or by some other device. Although the processes 300–600 are described with reference to the flowchart illustrated in FIGS. 3–6, a person of ordinary skill in the art will readily appreciate that many other methods of performing the process 300–600 may be used. For example, the order of many of the blocks may be altered, the operation of one or more blocks may be changed, blocks may be combined, and/or blocks may be eliminated.

Figure 3:
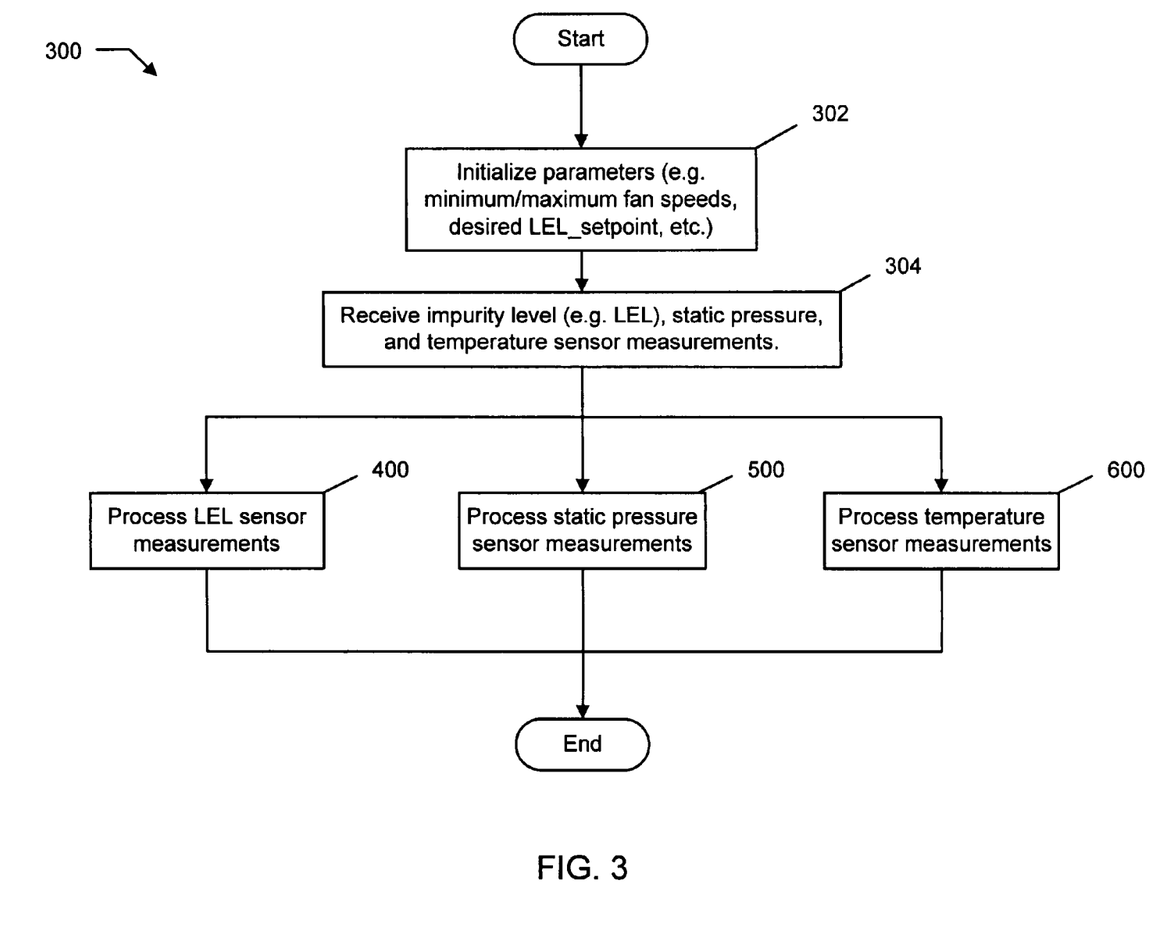
FIG. 3 is a flowchart representative of example machine readable instructions which may be executed by a device to implement an example method of controlling an enclosed printing press environment.

In general, the example process 300 controls the printing press environment 100 (or other enclosed environment) by adjusting the speeds of the intake fan 120 and/or the exhaust fan 130. The intake fan speed is adjusted to maintain a first environmental parameter (e.g. static pressure) and the exhaust fan speed is adjusted to maintain a second environmental parameter (e.g. LEL level). The PLC 122 and the PLC 123 determine if the intake fan speed and the exhaust fan speed, respectively, need to be adjusted, based on measurements from the sensors within the printing press environment 100.

The example process 300 begins by initializing parameters such as a maximum speed and a minimum speed for the intake fan 120, a maximum speed and a minimum speed for the exhaust fan 130, a desired temperature range within the enclosure 102, a desired LEL level within the enclosure 102 and a desired static pressure level within the enclosure 102 (block 302). The desired temperature range within the enclosure 102, the desired LEL level within the enclosure 102, and the desired static pressure level within the enclosure 102 are herein referred to as TEMP_SETPOINT, LEL_SETPOINT, and STAT_PRESS_SETPOINT, respectively. The LEL_SETPOINT may be chosen to be a value such that the enclosure 102 meets safety requirements, which prescribe a minimum exhaust condition, or to be a value that maximizes energy efficiency. The STAT_PRESS_SETPOINT may be chosen to be some negative static pressure which will help to contain the impurities in the air within the enclosure 102. The TEMP_SETPOINT may be chosen to be a temperature that creates a comfortable working environment or in some cases may increase the efficiency of the printing process.

Once these and other variables are initialized, the process 300 receives measurements from the LEL sensor 118, static pressure sensor 116, and the temperature sensor 114 (block 304). The process 300 continues and executes processes 400, 500, and 600 to process each sensor measurement and determine what actions are needed.

Figure 4:
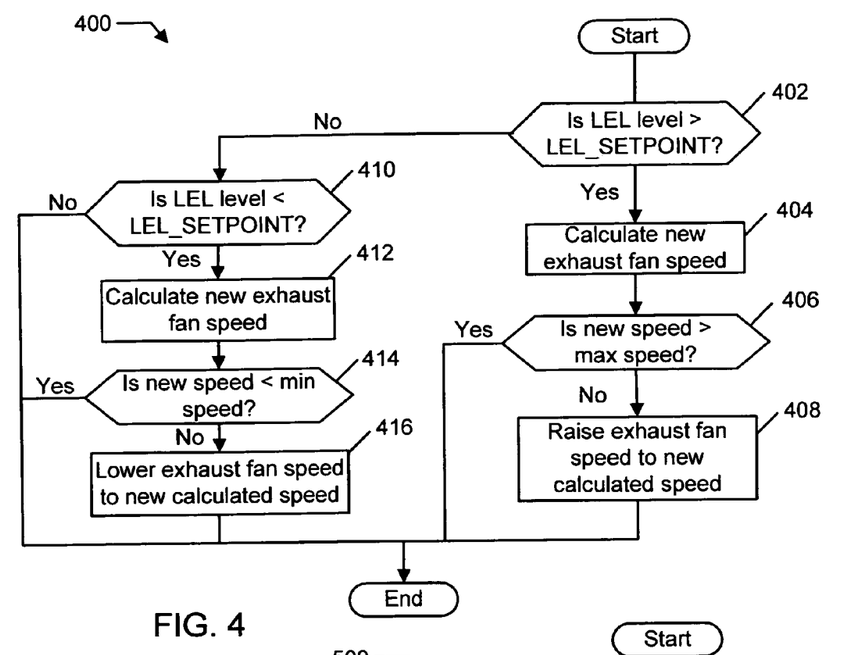
FIG. 4 is a flowchart representative of example machine readable instructions which may be executed by a device to implement an example method of processing lower explosive limit level measurements and adjusting exhaust fan speeds.

The process 400 receives the measurement of LEL levels within the enclosure 102 from one or more LEL sensors 118. The PLC 123 then determines if the reported LEL level is greater than the LEL_SETPOINT (block 402). LEL levels may fluctuate within the enclosure 102 due to variations in materials being printed in the gravure press 104 or due to different stages in a printing process.

If the LEL level received from the LEL sensor 118 is greater than the LEL_SETPOINT, a new exhaust fan speed is calculated (block 404). Since the LEL level is greater than LEL_SETPOINT, the exhaust fan speed needs to be increased to remove greater amounts of impurities from within the enclosure 102. The new exhaust fan speed can be calculated using several methods. One method is to use a lookup table. A difference between the reported LEL level and the LEL_SETPOINT is calculated and is used to access the lookup table, which returns the new exhaust fan speed. Another method is to use a mathematical model of the exhaust fan system and characteristics of the enclosure 102. The difference between the reported LEL level and LEL_SETPOINT is used by the model to calculate the new exhaust fan speed. Yet another method is to slowly adjust the exhaust fan speed until the LEL_SETPOINT is reached.

After the new exhaust fan speed is calculated, the new exhaust fan speed is compared to the predetermined maximum exhaust fan speed (block 406). If the new exhaust fan speed is greater than the predetermined maximum exhaust speed, the process 400 does not change the exhaust fan speed and exits. If the new exhaust fan speed is less than the predetermined maximum exhaust fan speed, the PLC 123 increases the exhaust fan speed to be equal to the new exhaust fan speed (block 408). The process 400 then exits.

If the LEL level received from the LEL sensor 118 is not greater than LEL_SETPOINT, process 400 determines if the LEL level is less than LEL_SETPOINT (block 410). If the LEL level is less than LEL_SETPOINT, the PLC 123 calculates a new exhaust fan speed (block 412). The new exhaust speed is a lower speed than the present speed to allow the LEL level within the enclosure 102 to increase. The new exhaust fan speed may be calculated in a similar method as described above for the case where the LEL level is greater than LEL_SETPOINT.

After the new exhaust fan speed is calculated, the new exhaust fan speed is compared to the predetermined minimum exhaust fan speed (block 414). If the new exhaust fan speed is lower than the predetermined minimum exhaust fan speed, the process 400 exits. If the new exhaust fan speed is greater than the predetermined minimum exhaust fan speed, the PLC 123 decreases the exhaust fan speed to be equal to the new exhaust fan speed (block 416). The process 400 then exits.

If the LEL level within the enclosure 102 is not less than LEL_SETPOINT and the LEL level within the enclosure 102 is not greater than LEL_SETPOINT, the LEL level within the enclosure 102 is equal to LEL_SETPOINT. In such an instance, the process 400 does not adjust the exhaust fan speed and exits.

Figure 5:
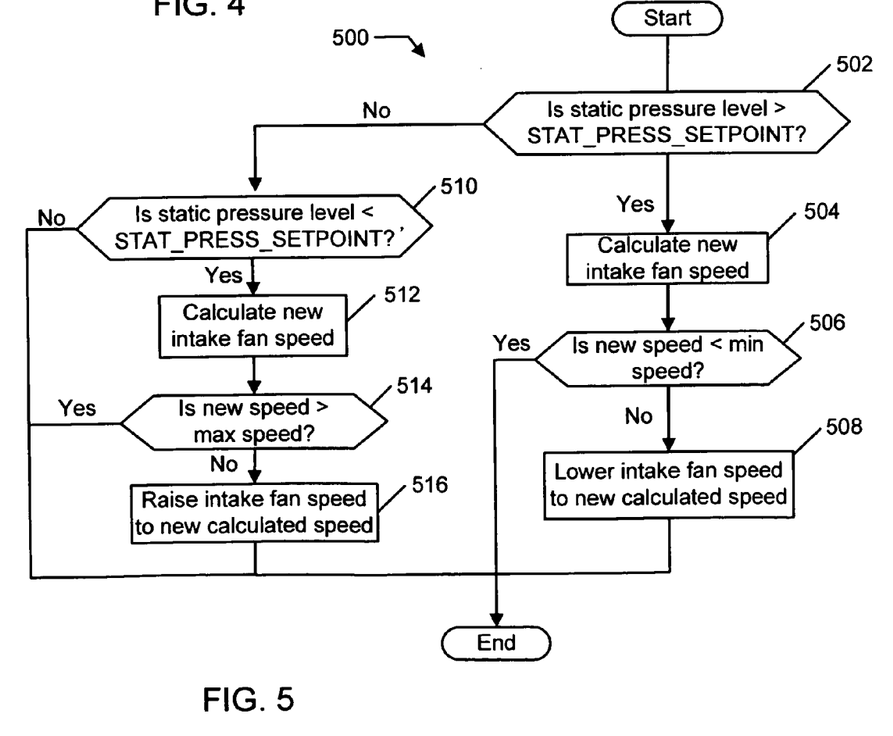
FIG. 5 is a flowchart representative of example machine readable instructions which may be executed by a device to implement an example method of processing static pressure level measurements and adjusting intake fan speeds.

The static pressure within the enclosure 102 may fluctuate due to the amount of contaminated air 112 being exhausted. If the LEL level within the enclosure 102 is higher than LEL_SETPOINT, process 400 increases the exhaust fan speed. The increased exhaust fan speed results in a greater amount of air being exhausted from the enclosure 102 which would decrease the static pressure within the enclosure 102 if the intake fan speed remained constant. On the other hand, if the LEL level within the enclosure 102 is lower than the LEL_SETPOINT, the process 400 decreases the exhaust fan speed which would result in a greater static pressure within the enclosure if the intake fan speed remained constant. In order to prevent fluctuation of the static pressure, the process 500 adjusts the speed of the intake fan 120.

Specifically, the process 500 receives a static pressure measurement from one or more static pressure sensors 116. The PLC 122 then determines if the reported static pressure is greater than the STAT_PRESS_SETPOINT (block 502). If the static pressure is greater than the STAT_PRESS_SETPOINT, a new intake fan speed is calculated (block 504). Since the static pressure is greater than STAT_PRESS_SETPOINT, the intake fan speed is lowered to allow more air to be exhausted by the exhaust fan 130 than is being supplied by the intake fan 120 to lower the static pressure within the enclosure 102. The new intake fan speed may be calculated by using a lookup table similar to the lookup table used in calculating the new exhaust speed or by another method. Using the lookup table, the reported static pressure within the enclosure 102 is subtracted from STAT_PRESS_SETPOINT and a difference is produced. The difference between the two values may be used to access the lookup table and determine the new intake fan speed. Another method is to slowly adjust the intake fan speed until the STAT_PRESS_SETPOINT is reached.

After the new exhaust fan speed is calculated, the new intake fan speed is compared to the predetermined minimum intake fan speed (block 506). If the new intake fan speed is less than the predetermined minimum intake speed, the process 500 does not change the intake fan speed and exits.

If the new intake fan speed is greater than the predetermined minimum intake fan speed, the PLC 122 decreases the intake fan speed to be equal to the new intake fan speed (block 508). The process 500 then exits.

If the static pressure is not greater than STAT_PRESS_SETPOINT, the PLC 122 determines if the reported static pressure level is less than STAT_PRESS_SETPOINT (block 510). If the static pressure is less than STAT_PRESS_SETPOINT, the PLC 122 calculates a new intake fan speed (block 512). The new intake fan speed will be a greater speed than the present speed to allow the supply of outside air 108 to increase, thereby raising the static pressure within the enclosure 102. The new intake fan speed may be calculated in a similar method as described above for the case where the static pressure is greater than STAT_PRESS_SETPOINT.

After the new intake fan speed is calculated, the new intake fan speed is compared to the predetermined maximum intake fan speed (block 514). If the new intake fan speed is greater than the predetermined maximum intake fan speed, the process 500 exits. If the new intake fan speed is less than the predetermined maximum intake fan speed, the PLC 122 increases the intake fan speed to be equal to the new intake fan speed (block 516). The process 500 then exits.

If the static pressure level within the enclosure 102 is not less than STAT_PRESS_SETPOINT and the static pressure level with the enclosure 102 is not greater than STAT_PRESS_SETPOINT, the static pressure level within the enclosure 102 is equal to STAT_PRESS_SETPOINT. In such an instance, the process 500 does not adjust the intake fan speed and exits.

Figure 6:
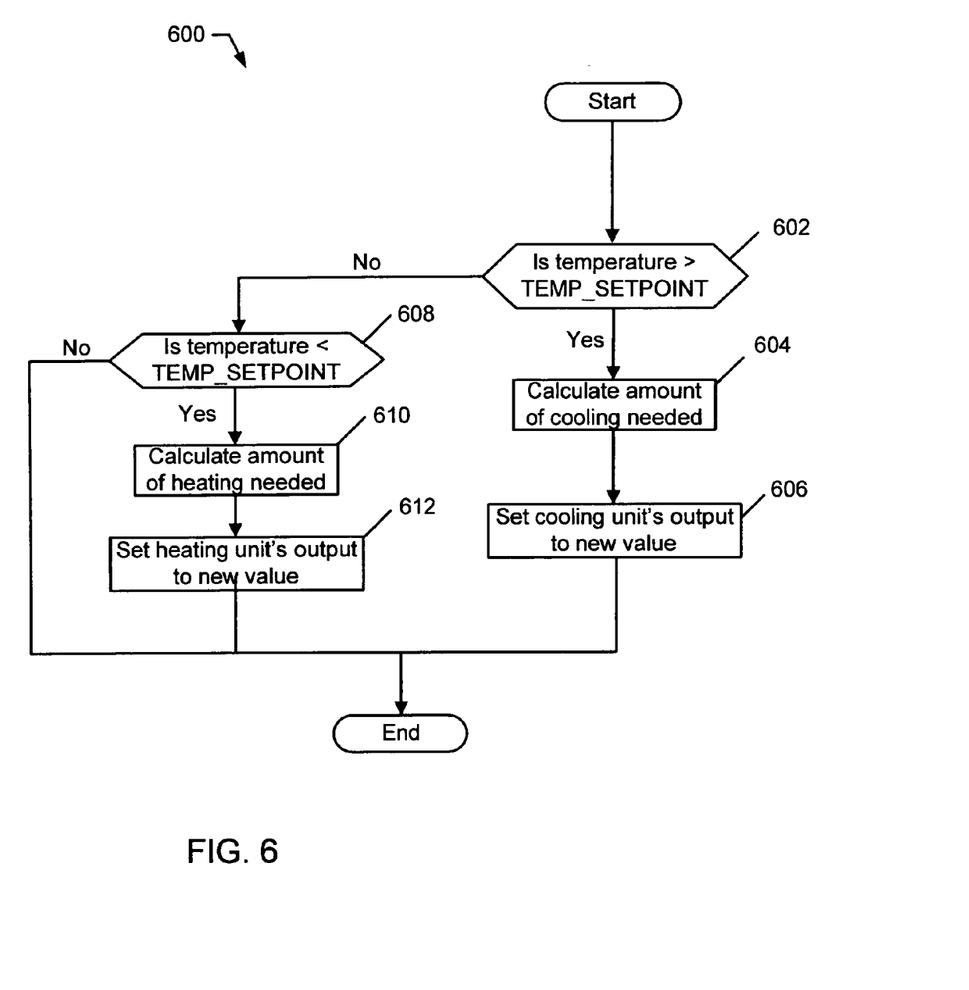
FIG. 6 is a flowchart representative of example machine readable instructions which may be executed by a device to implement an example method of processing temperature measurements and adjusting heating and/or cooling units to condition intake air.

The temperature within the enclosure 102 may also fluctuate. Some stages of a printing process may generate more heat than other stages and will cause the temperature within the enclosure to rise. The temperature of the supply of outside air 108 may also cause the temperature within the enclosure 102 to fluctuate. If the supply of outside air 108 differs from TEMP_SETPOINT, the temperature within the enclosure 102 will change. In order to prevent the fluctuation of temperature, the process 600 adjusts the heating unit 126 and/or the cooling unit 128 to condition the air entering the enclosure 102.

Specifically, process 600 receives a temperature measurement from one or more temperature sensors 114. The PLC 122 determines if the present temperature within the enclosure 102 is greater than TEMP_SETPOINT (block 602). If the temperature is greater than TEMP_SETPOINT, the PLC 122 calculates how much cooling is needed (block 604). A mathematical model, which is based on thermodynamic characteristics of air within the enclosure 102, the speed of the intake fan 120, the heating unit 126 and the cooling unit 128, may be used to calculate the amount of cooling or heating needed. A difference between the reported temperature and TEMP_SETPOINT is calculated and used by the mathematical model to determine the amount of increase or decrease needed in the heating unit 126 or the cooling unit 128. The PLC 122 then adjusts the cooling unit 128 so its output equals the calculated cooling value (block 606). The process 600 exits.

If the temperature within the enclosure 102 is not greater than TEMP_SETPOINT, the process 600 determines if the reported temperature within the enclosure 102 is less than TEMP_SETPOINT (block 608). If the reported temperature is less than TEMP_SETPOINT, the PLC 122 calculates how much heat is needed, based on the results of the mathematical model described above (block 610). The PLC 122 then adjusts the heating unit 126 so its output equals the calculated heating value (block 612). The process 600 then exits.

If the temperature within the enclosure 102 is not less than TEMP_SETPOINT and the temperature within the enclosure is not greater than TEMP_SETPOINT, the temperature is equal to TEMP_SETPOINT. In such an instance, the PLC 122 does not adjust the heating unit 126 or the cooling unit 128 and exits.

Although the above discloses example systems including, among other components, software executed on hardware, it should be noted that such systems are merely illustrative and should not be considered as limiting. For example, it is contemplated that any or all of the disclosed hardware and software components could be embodied exclusively in hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of controlling an enclosed environment, the method comprising:
   receiving a static pressure level measurement from a first sensor within the enclosed environment;
   receiving an impurity level measurement from a second sensor within the enclosed environment;
   adjusting a first speed associated with a first fan based on the static pressure level measurement; and
   adjusting a second speed associated with a second fan based on the impurity level measurement.

2. A method as defined in claim 1, wherein the first fan supplies air to the enclosed environment.

3. A method as defined in claim 1, wherein the second fan exhausts air from the enclosed environment.

4. A method as defined in claim 1, wherein the impurity level comprises a lower explosive limit level.

5. A method as defined in claim 1, wherein the enclosed environment comprises a printing press enclosure.

6. A method as defined in claim 1, wherein the first fan is adjusted to operate between a minimum speed and a maximum speed.

7. A method as defined in claim 1, wherein the second fan is adjusted to operate between a minimum speed and a maximum speed.

8. A method as defined in claim 1, wherein the static pressure level measurement from the second sensor is affected by the first speed of the first fan.

9. A method as defined in claim 1, wherein the first speed of the first fan is adjusted to maintain a static pressure level within the enclosed environment.

10. A method as defined in claim 1, wherein the second speed of the second fan is adjusted to maintain an impurity level.

11. A method as defined in claim 1, wherein air provided by the first fan is conditioned by at least one of a heating unit and a cooling unit to control a temperature within the enclosed environment.

12. A method as defined in claim 1, further comprising:
    receiving a third measurement from a third sensor; and
    adjusting a third speed associated with a third fan based on the third measurement.

13. A method as defined in claim 12, wherein the third measurement is another static pressure level measurement.

14. A method as defined in claim 12, wherein the third measurement is another impurity level measurement.

15. An apparatus for controlling an environmental parameter within an enclosed environment, the apparatus comprising:
a first fan to supply air to the enclosed environment;
a second fan to exhaust air from the enclosed environment;
a first sensor to monitor static pressure levels within the enclosed environment;
a second sensor to monitor impurity levels within the enclosed environment;
a controller operatively coupled to the first fan, the second fan, the first sensor, and the second sensor, wherein the controller is configured to receive measurements from the first sensor, to receive measurements from the second sensor, to adjust a first speed of the first fan based on the measurements from the first sensor, and to adjust a second speed of the second fan based on the measurements from the second sensor.

16. An apparatus as defined in claim 15, wherein the controller selects the first speed of the first fan to be within a speed range.

17. An apparatus as defined in claim 15, wherein the controller selects the second speed of the second fan to be within a speed range.

18. An apparatus as defined in claim 15, wherein the controller selects the first speed of the first fan to maintain a static pressure level within the enclosed environment.

19. An apparatus as defined in claim 15, wherein the controller selects the second speed of the second fan to maintain an impurity level associated with the enclosed environment.

20. An apparatus as defined in claim 19, wherein the impurity level comprises a lower explosive limit level.

21. An apparatus as defined in claim 15, further comprising a printing press within the enclosed environment.

22. An apparatus for controlling an enclosed environment, the apparatus comprising:
a processor system including a memory; and
instructions stored in the memory that enable the processor system to:
receive a static pressure level measurement from a first sensor within the enclosed environment;
receive an impurity level measurement from a second sensor within the enclosed environment;
adjust a first speed associated with a first fan based on the static pressure level measurement; and
adjust a second speed associated with a second fan based on the impurity level measurement.

23. An apparatus as defined in claim 22, wherein the first fan supplies air to the enclosed environment.

24. An apparatus as defined in claim 22, wherein the second fan exhausts air from the enclosed environment.

25. An apparatus as defined in claim 22, wherein the impurity level comprises a lower explosive limit level.

26. An apparatus as defined in claim 22, wherein the enclosed environment comprises a printing press enclosure.

27. An apparatus as defined in claim 22, wherein the instructions stored in the memory enable the processor system to adjust the first fan to operate between a minimum speed and a maximum speed.

28. An apparatus as defined in claim 22, wherein the instructions stored in the memory enable the processor system to adjust the second fan to operate between a minimum speed and a maximum speed.

29. An apparatus as defined in claim 22, wherein the static pressure level measurement from the second sensor is affected by the first speed of the first fan.

30. An apparatus as defined in claim 22, wherein the instructions stored in the memory enable the processor system to adjust the first speed of the first fan to maintain a static pressure level within the enclosed environment.

31. An apparatus as defined in claim 22, wherein the instructions stored in the memory enable the processor system to adjust the second speed of the second fan to maintain an impurity level.

32. An apparatus as defined in claim 22, wherein air provided by the first fan is conditioned by at least one of a heating unit and a cooling unit to control a temperature within the enclosed environment.

33. An apparatus as defined in claim 22, wherein the instructions stored in the memory enable the processor system to:
receive a third measurement from a third sensor; and
adjust a third speed associated with a third fan based on the third measurement.

34. An apparatus as defined in claim 33, wherein the third measurement is at least one of another static pressure level measurement and another impurity level measurement.

35. A machine accessible medium having instructions stored thereon that, when executed, cause a machine to:
receive a static pressure level measurement from a first sensor within an enclosed environment;
receive an impurity level measurement from a second sensor within the enclosed environment;
adjust a first speed associated with a first fan based on the static pressure level measurement; and
adjust a second speed associated with a second fan based on the impurity level measurement.

36. A machine accessible medium as defined in claim 35, wherein the first fan supplies air to the enclosed environment.

37. A machine accessible medium as defined in claim 35, wherein the second fan exhausts air from the enclosed environment.

38. A machine accessible medium as defined in claim 35, wherein the impurity level comprises a lower explosive limit level.

39. A machine accessible medium as defined in claim 35, wherein the enclosed environment comprises a printing press enclosure.

40. A machine accessible medium as defined in claim 35 having instructions stored thereon that, when executed, cause the machine to adjust the first fan to operate between a minimum speed and a maximum speed.

41. A machine accessible medium as defined in claim 35 having instructions stored thereon that, when executed, cause the machine to adjust the second fan to operate between a minimum speed and a maximum speed.

42. A machine accessible medium as defined in claim 35, wherein the static pressure level measurement from the second sensor is affected by the first speed of the first fan.

43. A machine accessible medium as defined in claim 35 having instructions stored thereon that, when executed, cause the machine to adjust the first speed of the first fan to maintain a static pressure level within the enclosed environment.

44. A machine accessible medium as defined in claim 35 having instructions stored thereon that, when executed, cause the machine to adjust the second speed of the second fan to maintain an impurity level.

45. A machine accessible medium as defined in claim 35, wherein air provided by the first fan is conditioned by at least one of a heating unit and a cooling unit to control a temperature within the enclosed environment.

46. A machine accessible medium as defined in claim 35 having instructions stored thereon that, when executed, cause the machine to:

receive a third measurement from a third sensor; and
adjust a third speed associated with a third fan based on the third measurement.

47. A machine accessible medium as defined in 46, wherein the third measurement is at least one of another static pressure level measurement and another impurity level measurement.

\* \* \* \* \*